Dec. 12, 1950 — I. ANSON — 2,533,984

ADJUSTABLE HAY FEED RACK

Filed Aug. 23, 1946

INVENTOR.
Ira Anson
BY
Sam J. Slotsky
ATTORNEY

Patented Dec. 12, 1950

2,533,984

UNITED STATES PATENT OFFICE 2,533,984

ADJUSTABLE HAY FEED RACK

Ira Anson, Sioux City, Iowa

Application August 23, 1946, Serial No. 692,523

1 Claim. (Cl. 119—60)

My invention pertains to a hay feed rack.

An object of my invention is to provide certain arrangements in a hay feed rack wherein the size of the feeding openings through which the feeding animals insert their heads can be regulated and whereby such openings can be positioned at varying heights to correspondingly accommodate taller animals and the like.

A further object of my invention is to provide protecting means for preventing pigs or hogs from soiling or contaminating the hay in the feed rack.

A further object of my invention is to provide the above mentioned objects in a simple construction.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
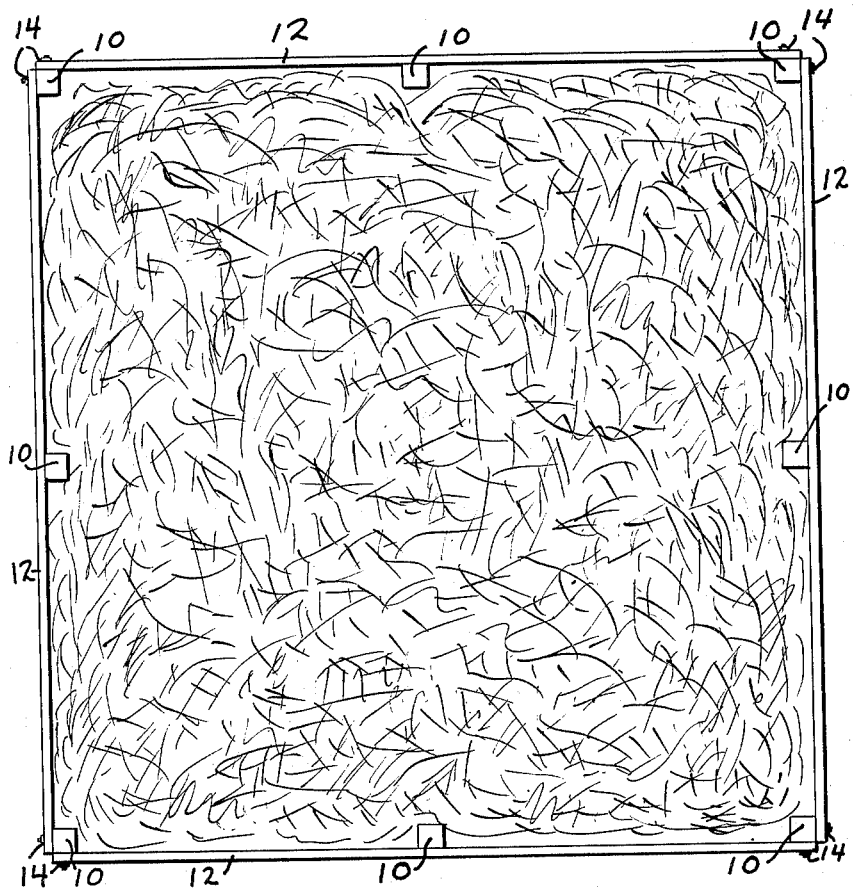
Figure 1 is a plan view of one type of hay feed rack employing my invention.
Figure 3:
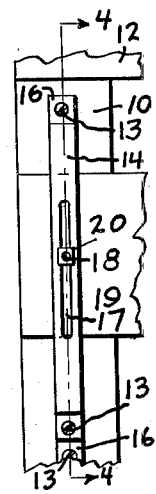
Figure 3 is a detail.
Figure 2:
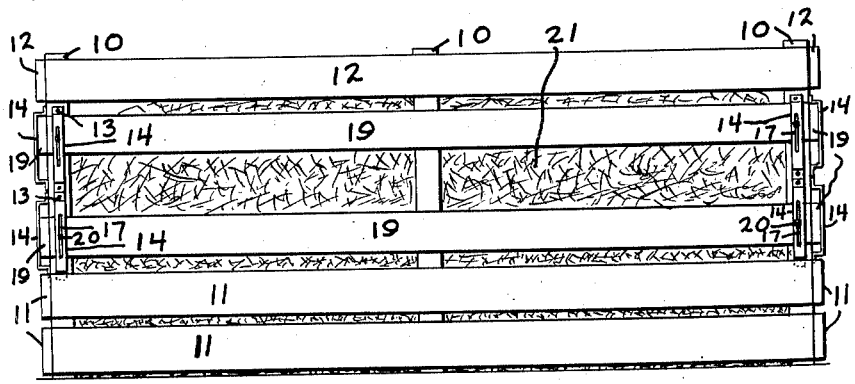
Figure 2 is a forward elevation of the rack.
Figure 4:
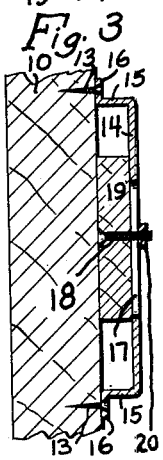
Figure 4 is a sectional view taken along the lines 4—4 of Figure 3.

I have used the character 10 to designate a series of vertical posts which are secured in the ground, and attached across the posts are the various lower planks 11 and upper planks 12, these planks being thus arranged to provide substantially a square shaped enclosure, it being understood however, that rectangular shaped, or other shaped enclosures can be employed using my invention. Attached at 13 to the posts 10 are the retaining brackets 14 including the ends 15 for providing a space between the members 14 and the posts, the brackets also including the extending flanges 16 through which the attaching means 13 pass. The bracket members 14 also include the vertical elongated slots 17 which slots receive the bolts 18 which bolts 18 are solidly secured to the further boards or planks 19, the ends of which planks are received between the posts 10 and members 14. The bolts 18 include the nuts 20 threadably engaged therewith for locking the planks 19 securely in desired position.

It will be noted that there are provided two of the brackets 14 on each post side to provide means for securing each end of both members 19. By loosening the nuts 20, the planks 19 can be raised or lowered as desired by allowing the studs 18 to slide through the slots 17, after which the nuts are tightened. This allows the opening 21 between the upper and lower members 19 to be reduced, or increased as required to accommodate the larger heads of cows, or the smaller heads of the younger calves, so that the size of openings as well as the height can be adjusted for the size and height of animals feeding on the hay inside of the enclosure. The lower members 19 also prevent pigs or hogs from jumping over and into the openings and soiling the hay therein, which ordinarily causes the cattle not to eat the hay.

These adjustable members therefore protect the hay against contamination as well as provide the above mentioned adjustable openings. The construction herein shown shows the adjustable members arranged on each side of the square enclosure, although if desired they can be located on only one side or any number of sides.

It will now be seen that I have provided all the advantages mentioned in the objects of my invention with further other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A hay feed rack including vertically positioned supporting end posts, a pair of horizontally positioned boards attached to said supporting posts, means for spacing said boards a desired distance apart including substantially U-shaped brackets for each board end attached to said supporting posts, the ends of said boards being received within said brackets, said brackets having vertically positioned slots therein, bolts attached to said boards received in said slots, said brackets being of sufficient length in comparison to the width of said boards whereby said boards can be adjustably positioned to provide desired spacing between the boards, means for securing said bolts to said brackets including nuts attached thereto.

IRA ANSON.

REFERENCES CITED

The following references are of record in the file of this patent:

UNITED STATES PATENTS

| Number | Name | Date |
|---|---|---|
| 387,891 | Light | Aug. 14, 1888 |
| 501,522 | Marshal, Jr. | July 18, 1893 |
| 580,054 | Merriman | Apr. 6, 1897 |
| 906,013 | Harding | Dec. 8, 1908 |
| 1,532,276 | Swartz | Apr. 7, 1925 |
| 2,140,856 | Sentz | Dec. 20, 1938 |